US009852635B2

(12) United States Patent
Fukuda et al.

(10) Patent No.: US 9,852,635 B2
(45) Date of Patent: Dec. 26, 2017

(54) DRIVING SUPPORT APPARATUS

(71) Applicant: DENSO CORPORATION, Kariya, Aichi-pref. (JP)

(72) Inventors: Katsuyuki Fukuda, Kariya (JP); Takeshi Kawashima, Kariya (JP); Takeshi Hatoh, Kariya (JP); Daisuke Takemori, Kariya (JP); Toshiyuki Konishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/038,490

(22) PCT Filed: Oct. 30, 2014

(86) PCT No.: PCT/JP2014/005500
§ 371 (c)(1),
(2) Date: May 23, 2016

(87) PCT Pub. No.: WO2015/079623
PCT Pub. Date: Jun. 4, 2015

(65) Prior Publication Data
US 2016/0300491 A1    Oct. 13, 2016

(30) Foreign Application Priority Data
Nov. 27, 2013  (JP) ................................ 2013-245089

(51) Int. Cl.
*B60Q 1/00* (2006.01)
*G08G 1/16* (2006.01)
(Continued)

(52) U.S. Cl.
CPC ............... *G08G 1/167* (2013.01); *B60R 1/00* (2013.01); *G06T 7/20* (2013.01); *G06T 11/60* (2013.01);
(Continued)

(58) Field of Classification Search
None
See application file for complete search history.

(56) References Cited

U.S. PATENT DOCUMENTS

2005/0256630 A1* 11/2005 Nishira .............. B60K 31/0008
701/96
2007/0109406 A1*  5/2007 Schofield ............... B60N 2/002
348/116
(Continued)

FOREIGN PATENT DOCUMENTS

JP       2006051850 A      2/2006
JP   WO 2006016433 A1 *  2/2006 ............... B60R 1/00
(Continued)

*Primary Examiner* — Julie Lieu
(74) *Attorney, Agent, or Firm* — Harness, Dickey & Pierce, P.L.C.

(57) ABSTRACT

A driving support apparatus includes an image acquisition that acquires a captured image, a calculator that calculates distance and relative speed between a subject vehicle and a following vehicle, and distances and relative speeds between following vehicles; an evaluator that evaluates a degree of risk caused when the subject vehicle changes a lane to the adjacent lane with respect to the following vehicles on a basis of the distances and the relative speeds; and a display controller that creates support information on the degree of risk associated with a lane change in association with road sections based on positions at which the following vehicles are present, and displays a support image in which a created support information is superimposed on the captured image at a corresponding position on the display portion.

12 Claims, 7 Drawing Sheets

(51) Int. Cl.
*B60R 1/00* (2006.01)
*G06T 7/20* (2017.01)
*G06T 11/60* (2006.01)

(52) U.S. Cl.
CPC . *B60R 2300/804* (2013.01); *B60R 2300/8093* (2013.01)

(56) References Cited

U.S. PATENT DOCUMENTS

| | | | | |
|---|---|---|---|---|
| 2007/0120657 | A1* | 5/2007 | Schofield | B60N 2/002 340/435 |
| 2009/0265061 | A1* | 10/2009 | Watanabe | G08G 1/165 701/36 |
| 2011/0128138 | A1 | 6/2011 | Yamamoto et al. | |
| 2011/0181728 | A1* | 7/2011 | Tieman | B60R 1/00 348/148 |
| 2012/0154591 | A1* | 6/2012 | Baur | B60R 1/00 348/148 |
| 2015/0251602 | A1* | 9/2015 | Baur | B60R 1/00 348/148 |
| 2016/0332572 | A1* | 11/2016 | Gibeau | B60R 1/00 |

FOREIGN PATENT DOCUMENTS

| | | |
|---|---|---|
| JP | 2008123215 A | 5/2008 |
| JP | 2008222153 A | 9/2008 |
| JP | 2011118482 A | 6/2011 |

* cited by examiner

PHOTOGRAPHIC IMAGE BY CAMERA 100   103  102         101

FIG. 5B

DISPLAY EXAMPLE 1
IN WHICH HIGHLIGHTING IMAGE
IS SUPERIMPOSED
                              HIGHLIGHTING (RISK DEGREE: LOW)

HIGHLIGHTING (RISK DEGREE: HIGH)

DRIVING SUPPORT APPARATUS

CROSS-REFERENCE TO RELATED APPLICATIONS

This application is a U.S. National Phase Application under 35 U.S.C. 371 of International Application No. PCT/JP2014/005500 filed on Oct. 30, 2014 and published in Japanese as WO 2015/079623 A1 on Jun. 4, 2015. This application is based on and claims the benefit of priority from Japanese Patent Application No. 2013-245089 filed on Nov. 27, 2013. The entire disclosures of all of the above applications are incorporated herein by reference.

TECHNICAL FIELD

The present disclosure relates to a driving support apparatus that displays an image obtained by imaging a rear side of a subject vehicle.

BACKGROUND ART

A technique in which an adjacent lane on a rear side of a subject vehicle is imaged by a camera, and driving support information such as a guide line functioning as an indication of whether a lane change is enabled is superimposed on an image acquired by imaging for display has been proposed (for example, refer to Patent Literature 1).

The inventors of the present application have found the following regarding a driving support apparatus.

In the technique disclosed in Patent Literature 1, the guide line functioning as the indication of whether the lane change is enabled is displayed on the basis of one closest following vehicle that travels in an adjacent lane on the rear side of the subject vehicle. According to the technique, since only the guide line corresponding to the closest following vehicle is displayed, when a driver has given up a lane change in front of the closest following vehicle, the indication for determining whether the lane change is enabled after that following vehicle may not be given to the driver in advance. Therefore, after the subject vehicle is overtaken by the closest following vehicle, the driver may have to determine whether the lane change is enabled with reference to the guide line corresponding to a subsequent closest following vehicle.

PRIOR ART LITERATURES

Patent Literature

Patent literature 1: JP 2006-51850 A

SUMMARY OF INVENTION

It is an object of the present disclosure to provide a technique displaying support information enabling a risk associated by a lane change to be determined in advance, with respect to multiple following vehicles.

According to one aspect of the present disclosure, a driving support apparatus that is communicably connected to an imaging portion that images an adjacent lane on a rear side of a subject vehicle, a situation acquisition that acquires information on whether a plurality of following vehicles travelling in the adjacent lane on the rear side of the subject vehicle are present or not and information on positions of the plurality of following vehicles, and a display portion that displays an image is provided. The driving support apparatus comprises an image acquisition, a calculator, an evaluator, and a display controller.

The image acquisition acquires a captured image captured by the imaging portion. The calculator calculates distance and relative speed between the subject vehicle and a following vehicle, and distances and relative speeds between the following vehicles, on a basis of the information acquired by the situation acquisition. The evaluator evaluates a degree of risk caused when the subject vehicle changes a lane to the adjacent lane with respect to the following vehicles on a basis of the distances and the relative speeds calculated by the calculator. The display controller creates support information on the degree of risk associated with a lane change in association with road sections based on positions at which the following vehicles are present on a basis of an evaluation result of the degree of risk by the evaluator, and displays a support image in which a created support information is superimposed on the captured image at a corresponding position on the display portion.

According to the driving support apparatus of the present disclosure, it may be possible to display and impose the support information associated with the road sections based on a position at which the multiple following vehicles are present, on the captured image based on the degree of risk evaluated for the multiple following vehicles that travel in the adjacent lane. According to the configuration, it may be possible for the driver to grasp the degree of risk associated with the lane change for not only one closest following vehicle but also the subsequent following vehicles in advance.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION

An embodiment of the present disclosure will be described with reference to the drawings. The present disclosure is not limited to the following embodiment, but can be implemented in various modes.

(Description of Configuration of Driving Support Apparatus)

Figure 1:
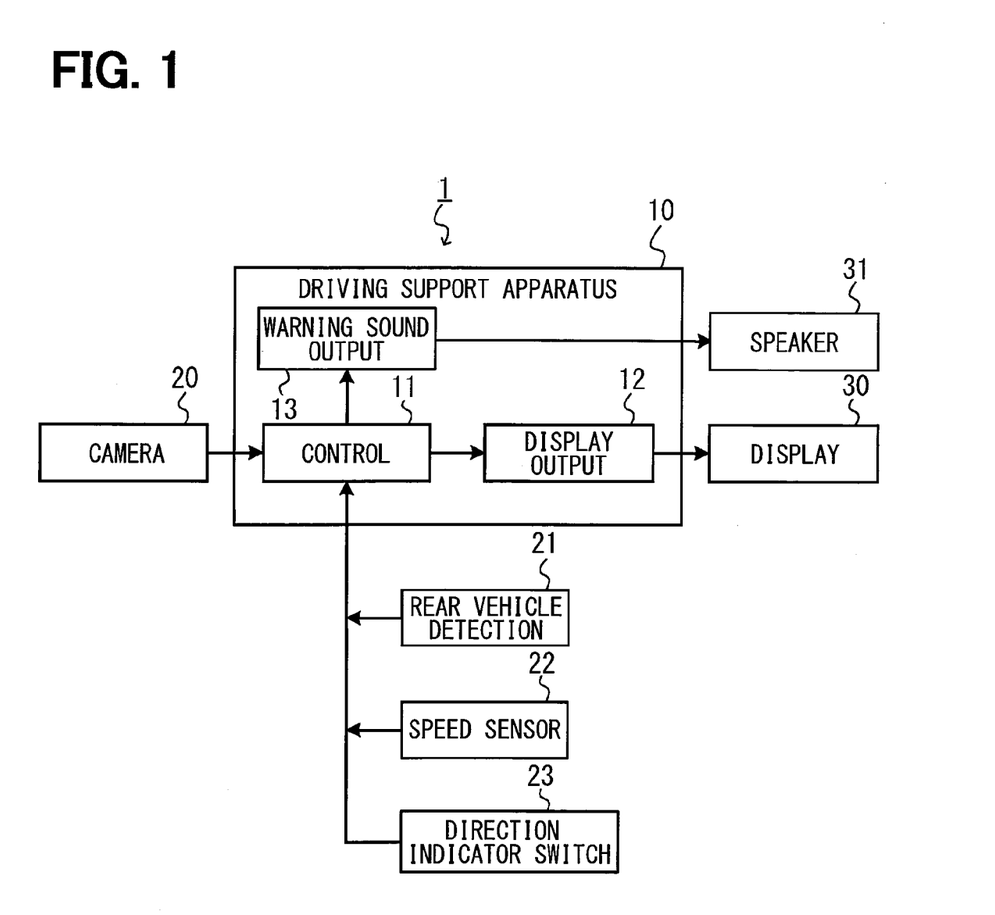
FIG. 1 is a block diagram illustrating a configuration of a driving support apparatus.

As illustrated in FIG. 1, a vehicle system 1 of an embodiment includes a driving support apparatus 10, and a camera 20, a rear vehicle detector 21, a speed sensor 22, a direction indicator switch 23, a display 30, and a speaker 31, which are connected to the driving support apparatus 10.

The camera 20 images a rear side of a vehicle (hereinafter, may be referred to as a subject vehicle 100) to which the vehicle system 1 is mounted. The camera 20 is fitted to, for example, a rearview mirror of the subject vehicle 100 or a vehicle side rearward so that mainly one lane in which the subject vehicle 100 is travelling and another lane (hereinafter referred to as an adjacent lane) adjacent to the lane in which the subject vehicle 100 is travelling fall within an imaging area. The camera 20 may be fitted to the right or left side of the vehicle.

The rear vehicle detector 21 is an object detection sensor for detecting presences or positions (relative positions to the subject vehicle 100) of following vehicles that are travelling in the adjacent lane on a rear side of the subject vehicle 100, which is in the imaging area of the camera 20, for example, due to image recognition of an image from a millimeter wave radar, a laser radar, or a camera. The speed sensor 22 detects a speed of the subject vehicle 100, and inputs a detection signal to the driving support apparatus 10. The direction indicator switch 23 is a switch for operating a direction indicator (also referred to as a turn signal or a blinker) installed in the subject vehicle 100, and outputs a switch signal for operating the direction indicator.

The display 30 is a display device for displaying an image captured by the camera 20 and support information superimposed on the captured image. The display 30 is installed, for example, to a meter panel in front of a driver's seat, or at a position close to an A pillar which is easily visible from a driver. The speaker 31 is an audio output device for outputting a warning sound corresponding to the degree of risk associated with a lane change.

The driving support apparatus 10 is an information processing apparatus (for example, a microcomputer) mainly including a CPU, a ROM, and a RAM not shown. The driving support apparatus 10 realizes a function of displaying the support information on the degree of risk associated with the lane change of the subject vehicle 100. The driving support apparatus 10 includes a controller 11, a display output portion 12, and a warning sound output portion 13 as a functional configuration for realizing the function.

The controller 11 determines the degree of risk caused when the subject vehicle 100 changes the lane to the adjacent lane due to an influence of multiple following vehicles detected by image processing on the captured image captured from the camera 20 or the rear vehicle detector 21. The determination of the degree of risk is performed by execution of a risk determination process (refer to FIG. 2) for a first closest following vehicle and a risk determination process (refer to FIG. 3) for the multiple following vehicles. A detailed procedure of those processing will be described later.

The controller 11 creates an image of the support information indicative of the degree of risk involved in a road section in which each following vehicle is travelling, on the basis of results of determining the degree of risk involved in the multiple following vehicles. The image of the support information is created as a highlighted display image that is superimposed on the captured image captured from the camera 20 in a region corresponding to the road section in which each following vehicle is travelling. When the controller 11 determines that there is an intention of the lane change on the basis of an operating state of the direction indicator switch 23, the controller 11 outputs the warning sound according to the degree of risk associated with the lane change. The display output portion 12 allows a support image in which an image of the support information created in the controller 11 is superimposed on the taken captured image to be output to and displayed on the display 30. The warning sound output portion 13 audibly outputs the warning sound based on the control of the controller 11 from the speaker 31.

(Risk Determination Process on First Closest Following Vehicle)

Figure 2:
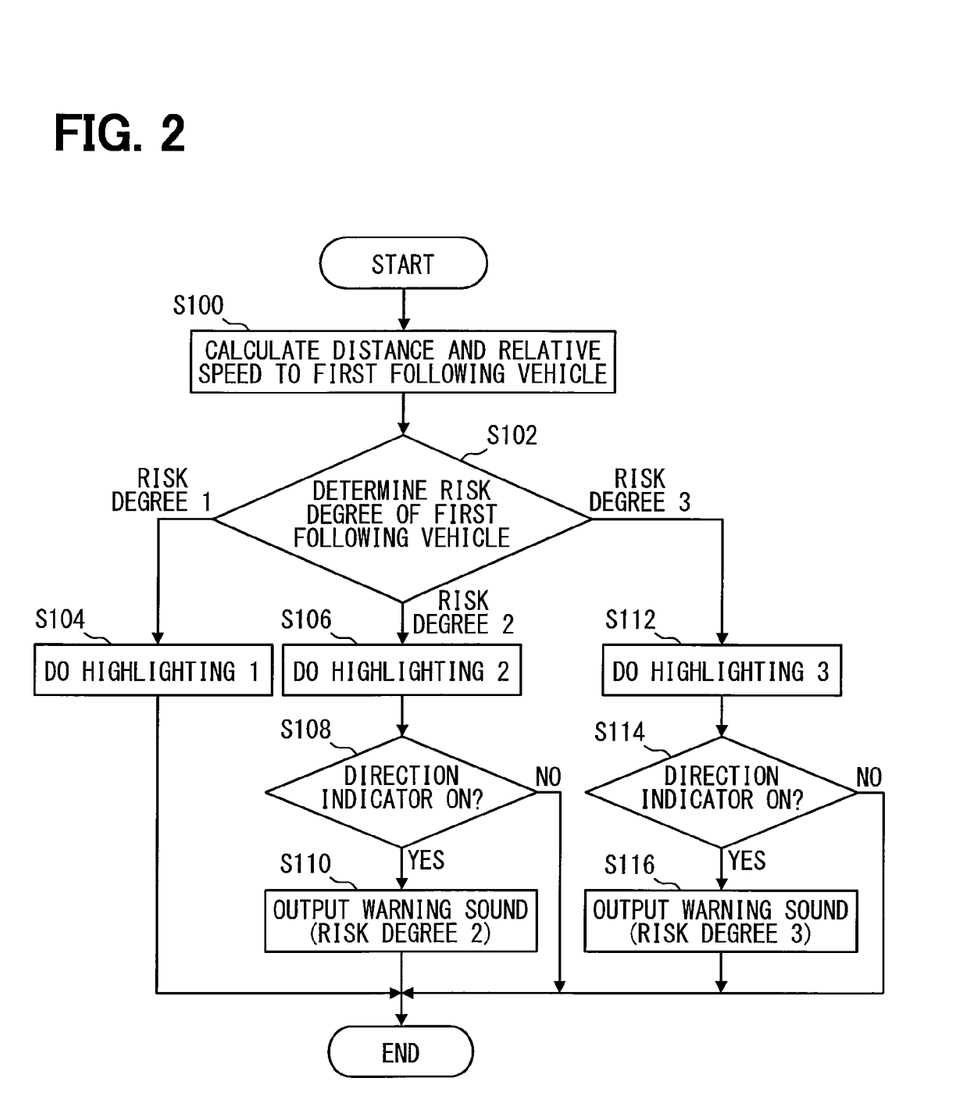
FIG. 2 is a flowchart illustrating a procedure of a risk determination process for a first closest following vehicle.

A procedure of the risk determination process on the first closest following vehicle will be described with reference to a flowchart of FIG. 2. The process is repetitively executed by the controller 11 of the driving support apparatus 10 in a predetermined control cycle.

In S100, the controller 11 calculates a distance and a relative speed between a first following vehicle 101, which is closest to the subject vehicle 100 among the following vehicles traveling in the adjacent lane, and the subject vehicle 100, on the basis of a detection result obtained from the rear vehicle detector 21. For example, the controller 11 may specify the positions of the following vehicles reflected on the captured image with the use of image recognition of the captured image captured from the camera 20, and calculate the distances between the following vehicles and the subject vehicle 100. In S102, the controller 11 determines the degree of risk involved in the first following vehicle 101 on the basis of the distance and the relative speed to the first following vehicle 101 which are calculated in S100, and the speed of the subject vehicle 100. In this example, the degree of risk is evaluated to be higher as the distance between the subject vehicle 100 and the following vehicle is shorter, as the relative speed is higher in a direction of bringing the subject vehicle 100 closer to the following vehicles, or as the speed of the subject vehicle 100 is higher. In the present embodiment, it is assumed that the degree of risk is evaluated with three levels of the degree of risk 1 (a low level), the degree of risk 2 (a middle level), and the degree of risk 3 (a high level). When it is determined that the first following vehicle 101 corresponds to the degree of risk 1 (the degree of risk 1 in S102), the controller 11 proceeds to S104. In S104, the controller 11 creates an image of the support information corresponding to the degree of risk 1 for the first following vehicle 101. When it is determined that the first following vehicle 101 is the degree of risk 2 (the degree of risk 2 in S102), the controller 11 proceeds to S106. In S106, the controller 11 creates an image of the support information corresponding to the degree of risk 2 for the first following vehicle 101. When it is determined that the first following vehicle 101 is the degree of risk 3 (the degree of risk 3 in S102), the controller 11 proceeds to S112. In S112, the controller 11 creates an image of the support information corresponding to the degree of risk 3 for the first following vehicle 101.

In S104, S106, and S112, the controller 11 creates an image in which a partial region of the adjacent lane based on a position at which the first following vehicle 101 is present is highlighted with a display mode corresponding to the degree of risk as an image of the support information, in the captured image acquired from the camera 20. In this example, the controller 11 creates a highlighted display image of the display mode corresponding to any one of the degree of risks 1 to 3 which is the determination result in S102, in a region on the captured image corresponding to a region at a predetermined distance from the first following vehicle 101 forward in a travelling direction. The controller 11 creates the highlighted display image of the display mode corresponding to the degree of risk 3 in the region of the captured image corresponding to a proximity region before and after the first following vehicle 101 in the travelling direction regardless of the determination result in S102. The proximity region may be changed, for example, according to the relative speed between the subject vehicle 100 and the first following vehicle 101, or the vehicle speed of the first following vehicle 101.

In S108, the controller 11 determines whether the direction indicator turns on, or not, on the basis of the operating state of the direction indicator switch 23. When the direction indicator is on (YES in S108), the controller 11 proceeds to S110. In S110, the controller 11 outputs a predetermined warning sound corresponding to the degree of risk 2 determined in S102 from the speaker 31 through the warning sound output portion 13. The warning sound generated in this case notifies the driver of a fact that the degree of risk of the middle level is involved in the lane change. When it is determined that the direction indicator is not on in S108 (NO in S108), the controller 11 completes this processing.

In S114, the controller 11 determines whether the direction indicator is on, or not, on the basis of the operating state of the direction indicator switch 23. When the direction indicator is on (YES in S114), the controller 11 proceeds to S116. In S116, the controller 11 outputs a predetermined warning sound corresponding to the degree of risk 3 determined in S102 from the speaker 31 through the warning sound output portion 13. The warning sound generated in this case notifies the driver of a fact that the degree of risk of the high level is involved in the lane change. When it is determined that the direction indicator is not on in S114 (NO in S114), the controller 11 completes the processing.

(Risk Determination Process on Between Multiple Following Vehicles)

Figure 3:
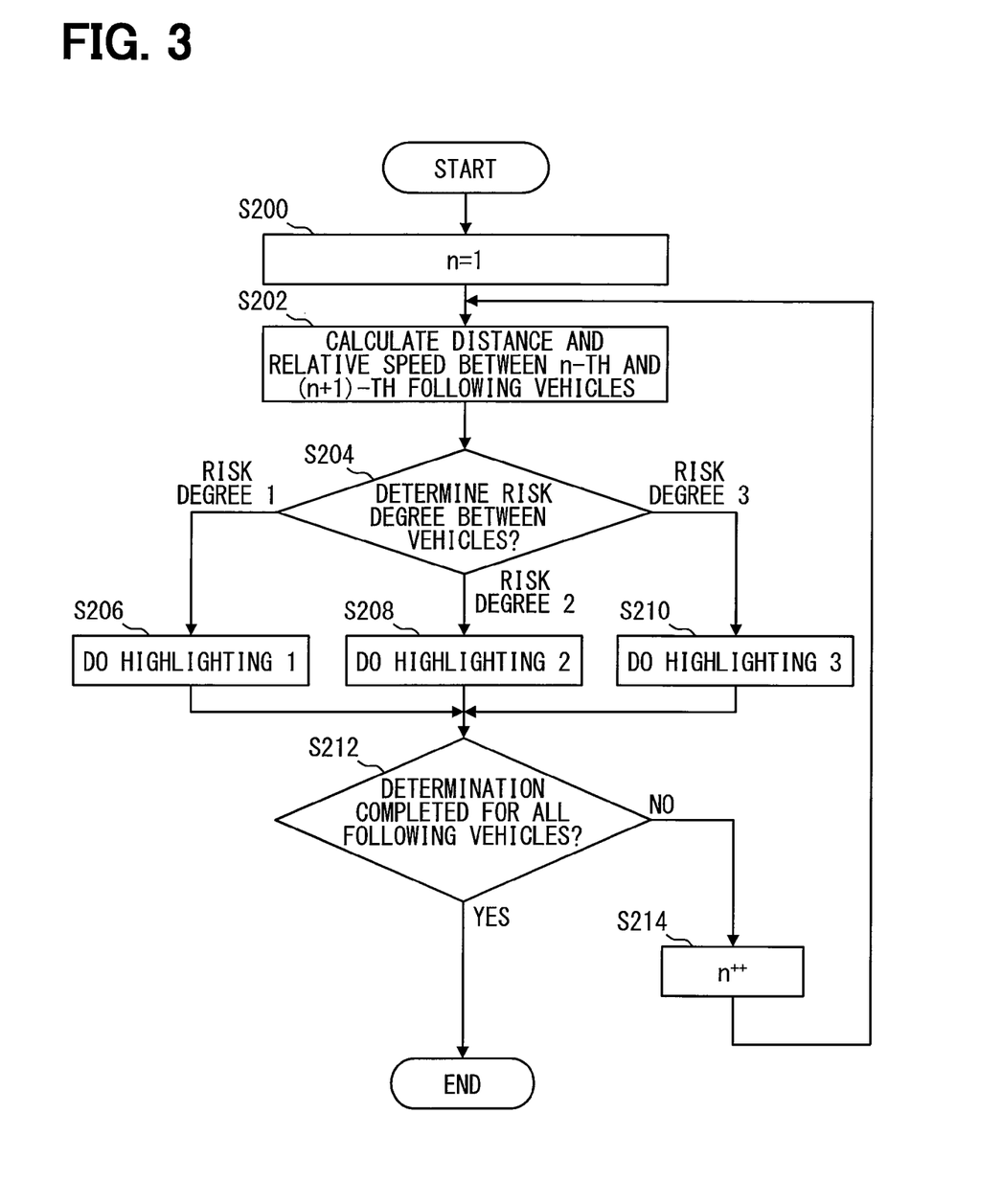
FIG. 3 is a flowchart illustrating a procedure of a risk determination process for multiple following vehicles.

A procedure of the risk determination process on between the multiple following vehicles will be described with reference to a flowchart of FIG. 3. The process is repetitively executed by the controller 11 of the driving support apparatus 10 in a predetermined control cycle.

In S200, the controller 11 sets a value (n) of a counter for counting the order of the following vehicles to one. In S202, the controller 11 calculates a distance and a relative speed between an n-th following vehicle and an (n+1)-th following vehicle closer to the subject vehicle 100 among the following vehicles traveling in the adjacent lane, on the basis of a detection result obtained from the rear vehicle detector 21. In this example, the controller 11 may specify the positions of the following vehicles reflected on the captured image with the use of image recognition of the captured image acquired from the camera 20, and calculate the distance between the following vehicles. In S204, the controller 11 determines, on the basis of the distance and the relative speed between the n-th and (n+1)-th following vehicles which are calculated in S200, and the speed of the subject vehicle 100, the degree of risk involved in those two following vehicles. In this example, for example, the degree of risk is evaluated to be higher as the distance between the two following vehicles is shorter, as the relative speed is higher in a direction of bringing the two following vehicles closer to each other, or as the speed of the subject vehicle 100 is higher. In this example, the degree of risk is evaluated with three levels of the degree of risk 1, the degree of risk 2, and the degree of risk 3. When it is determined that the degree of risk is the degree of risk 1 in S204 (the degree of risk 1 in S204), the controller 11 proceeds to S206. In S206, the controller 11 creates an image of the support information corresponding to the degree of risk 1 in a middle region between the n-th and (n+1)-th following vehicles. When it is determined that the degree of risk is the degree of risk 2 in S204 (the degree of risk 2 in S204), the controller 11 proceeds to S208. In S208, the controller 11 creates an image of the support information corresponding to the degree of risk 2 in the middle region between the n-th and (n+1)-th following vehicles. When it is determined that the degree of risk is the degree of risk 3 in S204 (the degree of risk 3 in S204), the controller 11 proceeds to S210. In S210, the controller 11 creates an image of the support information corresponding to the degree of risk 3 in the middle region between the n-th and (n+1)-th following vehicles.

In S206, S208, and S210, the controller 11 creates an image in which a region of the adjacent lane corresponding to the middle of the n-th and (n+1)-th following vehicles is highlighted with a display mode corresponding to the degree of risk as an image of the support information, in the captured image acquired from the camera 20. In this example, the controller 11 creates a highlighted display image of the display mode corresponding to any one of the degree of risks 1 to 3 which is the determination result in S206 in a region on the captured image corresponding to a region at a predetermined distance from two following vehicles in the middle of the respective following vehicles. The controller 11 creates the highlighted display image of the display mode corresponding to the degree of risk 3 in the region of the captured image corresponding to a proximity region before and after each following vehicle in the travelling direction regardless of the determination result in S206.

In S212, the controller 11 determines whether the degree of risk involved in all of the detected following vehicles has been determined, or not. When the following vehicle not yet determined is present (NO in S212), the controller 11 proceeds to S214. In S214, the controller 11 counts up the value (n) of the counter by one, and returns to S202. When the degree of risk involved in all of the detected following vehicles has been determined (YES in S212), the controller 11 completes this processing.

The images of the support information created in the "risk determination process on the first closest following vehicle" (refer to FIG. 2), and "risk determination process on between the multiple following vehicles" (refer to FIG. 3) are superimposed on each other at a corresponding position on the captured image captured from the camera 20, and displayed on the display 30 through the display output portion 12.

(Specific Example of Determination Result of Degree of Risk)

A specific example of a distribution condition of the degree of risk based on the "risk determination process on the first closest following vehicle" (refer to FIG. 2), and "risk determination process on between the multiple following vehicles" (refer to FIG. 3) will be described with reference to FIG. 4. In a case of FIG. 4, it is supposed that three following vehicles 101 to 103 are travelling in the same direction as that of the subject vehicle 100 at the rear of a right adjacent lane of the subject vehicle 100.

Figure 4:
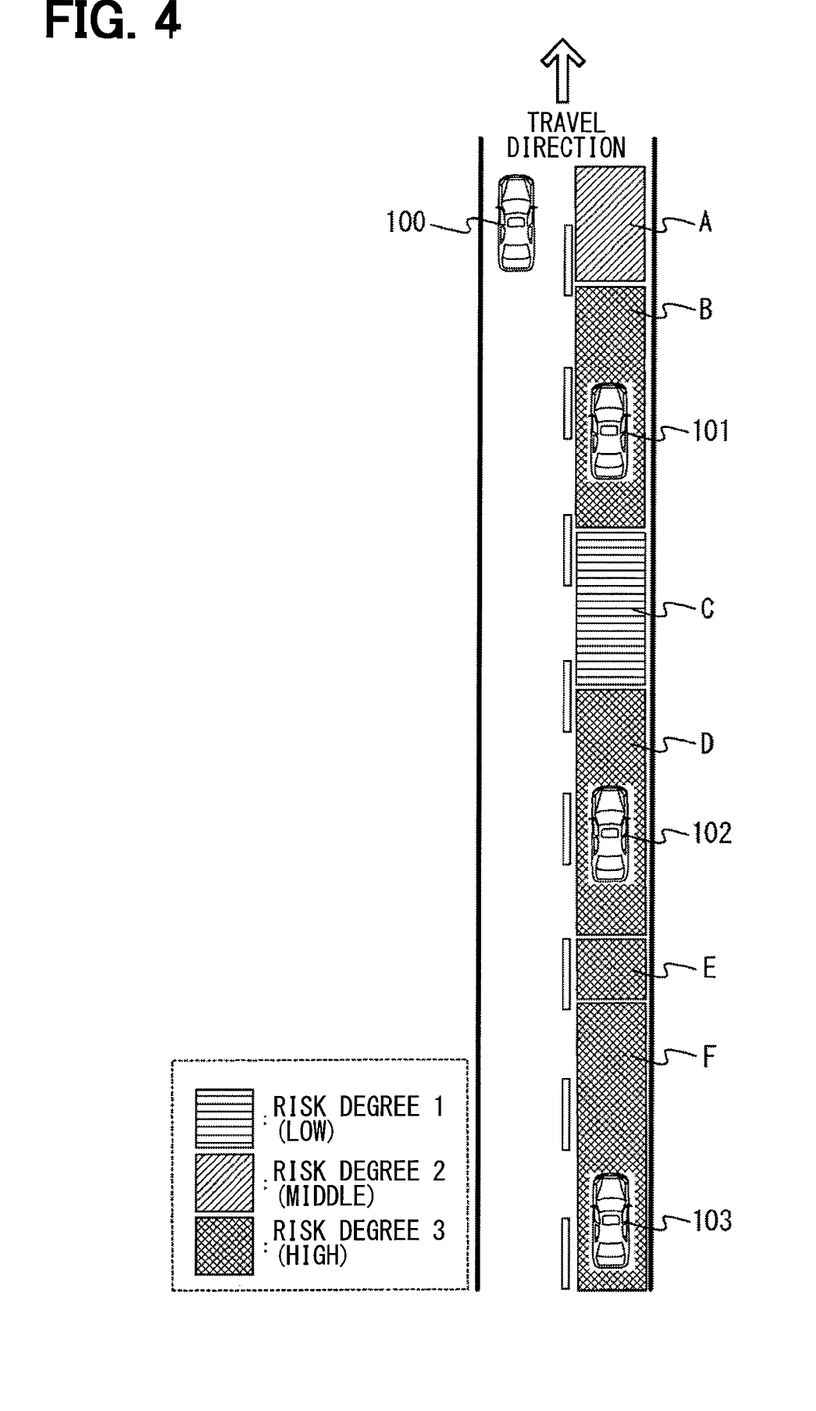
FIG. 4 is a diagram showing an outline of highlighting.

As illustrated in FIG. 4, the highlighting with the degree of risk 3 is allocated to respective regions B, D, F corresponding to proximity regions immediate before and immediate after the respective following vehicles 101 to 103 in the adjacent lane. Lengths before and after the regions B, D, F are variable, for example, according to the relative speed to the subject vehicle 100 or another following vehicle, or the vehicle speed of each following vehicle.

It is assumed that the following vehicle 101 closest to the subject vehicle 100 is determined as the degree of risk 2. In that case, the highlighting with the degree of risk 2 is allocated to the region A across the region B forward from the following vehicle 101. It is assumed that a middle region between the following vehicle 101 and the following vehicle 102 is determined to be the degree of risk 1. In that case, the highlighting with the degree of risk 1 is allocated to a region C corresponding to a clearance between the region B which is the proximity region of the following vehicle 101 and the region D which is the proximity region of the following vehicle 102.

It is assumed that a middle region between the following vehicle 102 and the following vehicle 103 is determined to be the degree of risk 3. In that case, the highlighting with the degree of risk 3 is allocated to a region E corresponding to a clearance between the region D which is the proximity region of the following vehicle 102 and the region F which is the proximity region of the following vehicle 103. A clearance between the region D and the region F is narrower than a total length of the subject vehicle 100. For that reason, when the lane is chanted and the subject vehicle 100 enters that clearance, the subject vehicle 100 may interfere with the proximity region of the following vehicles 102, 103. In this way, when the clearance of the proximity region between the two following vehicles is remarkably narrow, the highlighting with the degree of risk 3 is allocated to the clearance.

(Display Example of Highlighted Display Image)

As display examples of the image in which the highlighted display image is superimposed on the captured image captured from the camera 20, several cases different in an expression method will be described with reference to FIGS. 5A, 5B, 6A, and 6B.

Figure 5A:
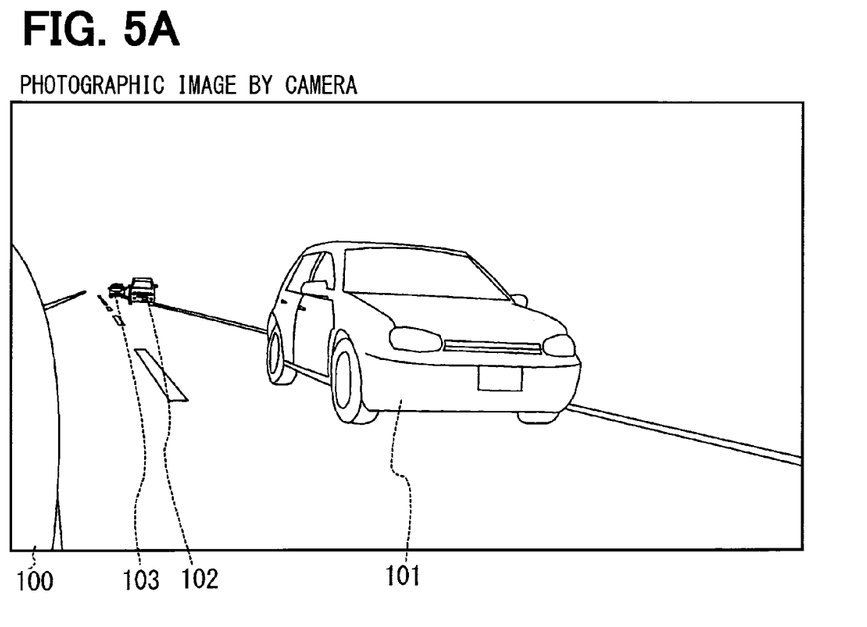
FIG. 5A is a diagram showing an image captured by a camera.

FIG. 5A is an example of the captured image acquired from the camera 20. A part of a body of the subject vehicle 100 is reflected on a left end of the captured image, and a landscape of the adjacent lane of the subject vehicle 100 is reflected in a right region of the left end. In addition, it is assumed that three following vehicles travelling in a row in the adjacent lane at the rear of the subject vehicle 100 are reflected in the captured image. Hereinafter, the three following vehicles are identified as a first following vehicle 101, a second following vehicle 102, and a third following vehicle 103 in order from the vehicle closer from the subject vehicle 100.

Figure 5B:
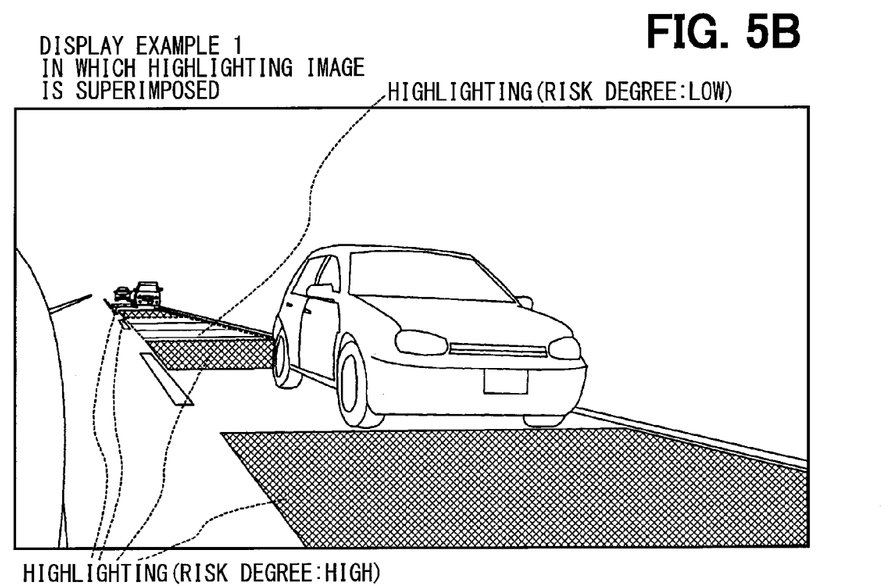
FIG. 5B is a diagram showing a first display example in which a highlighted display image is superimposed on the captured image.

FIG. 5B illustrates a first display example in which a planar highlighted display image is superimposed on the captured image illustrated in FIG. 5A. In this case, an expression method of covering an overall region where the degree of risk is to be displayed on a road of the adjacent vehicle with a design such as a solid color, hatching in a planar shape, is used. In the highlighted display image, a color, a pattern, thickness or transparency of the design is changed according to the degree of risk, thereby being capable of discriminating the degree of risk. The highlighted display image is not drawn in portions overlapping with the following vehicles in the captured image. Aside from the method of expressing the degree of risk for each region in a stepwise fashion, a method of continuously expressing the degree of risk with the use of colors, light and darkness, or the gradation of thickness may be employed.

Portions (or regions) in which the highlighted display image overlaps with the following vehicles in the captured image are determined by recognizing the shape of the following vehicles due to the image recognition.

Figure 6A:
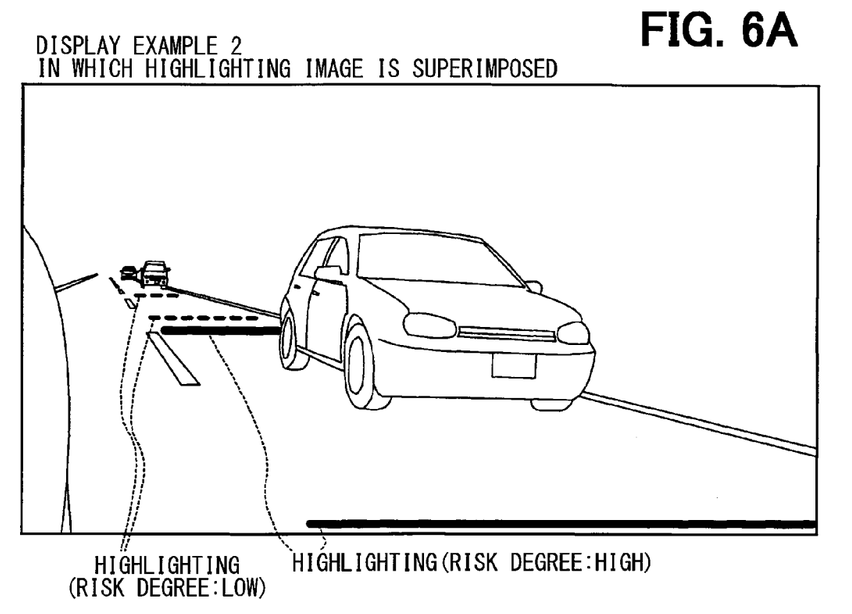
FIG. 6A is a diagram showing a second display example in which a highlighted display image is superimposed on the captured image.
Figure 6B:
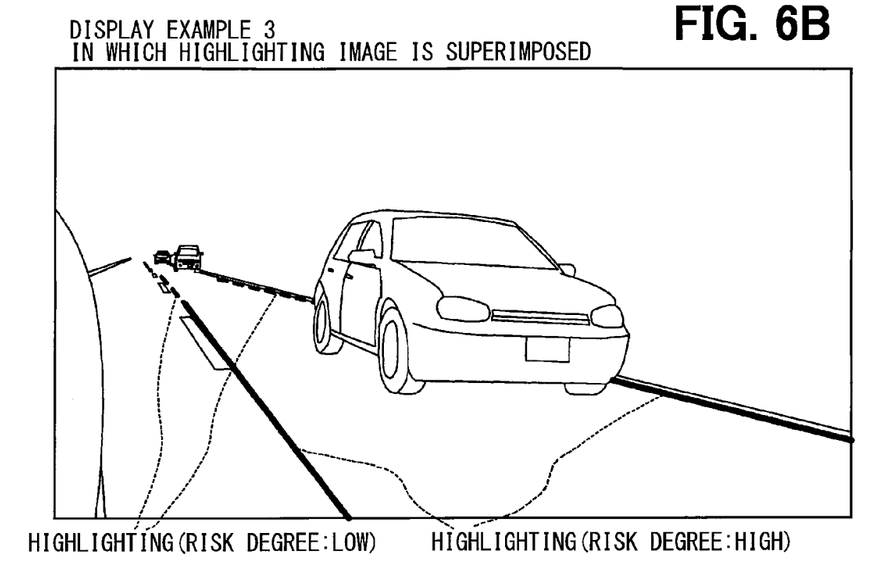
FIG. 6B is a diagram showing a third display example in which a highlighted display image is superimposed on the captured image.

FIG. 6A illustrates a second display example in which a linear highlighted display image is superimposed on the captured image illustrated in FIG. 5A. In this case, an expression method in which a region of the degree of risk is expressed by drawing line segments such as solid lines, dotted lines, or dashed lines in parallel to each other along a road surface, at a front end and a rear end of the region in which the degree of risk is to be displayed on the road surface of the adjacent lane is employed. FIG. 6B illustrates a third display example in which a linear highlighted display image is superimposed on the captured image illustrated in FIG. 5A. In this case, an expression method in which a region of the degree of risk is expressed by drawing lines such as solid lines, dotted lines, or dashed lines along both side ends (boundary of the adjacent lane) of the region in which the degree of risk is to be displayed on the road surface of the adjacent lane is employed. In more detail, the highlighted display image is drawn as line segments parallel to each other along white lines for separating the lanes drawn on the road surface. In the highlighted display images illustrated in FIGS. 6A and 6B, a color, a thickness, or a design (solid line, dotted line, dashed line) of the lines is changed according to the degree of risk, thereby being capable of discriminating the degree of risk. Those highlighted display images are not drawn in portions overlapped with the following vehicles in the image.

Figure 7:
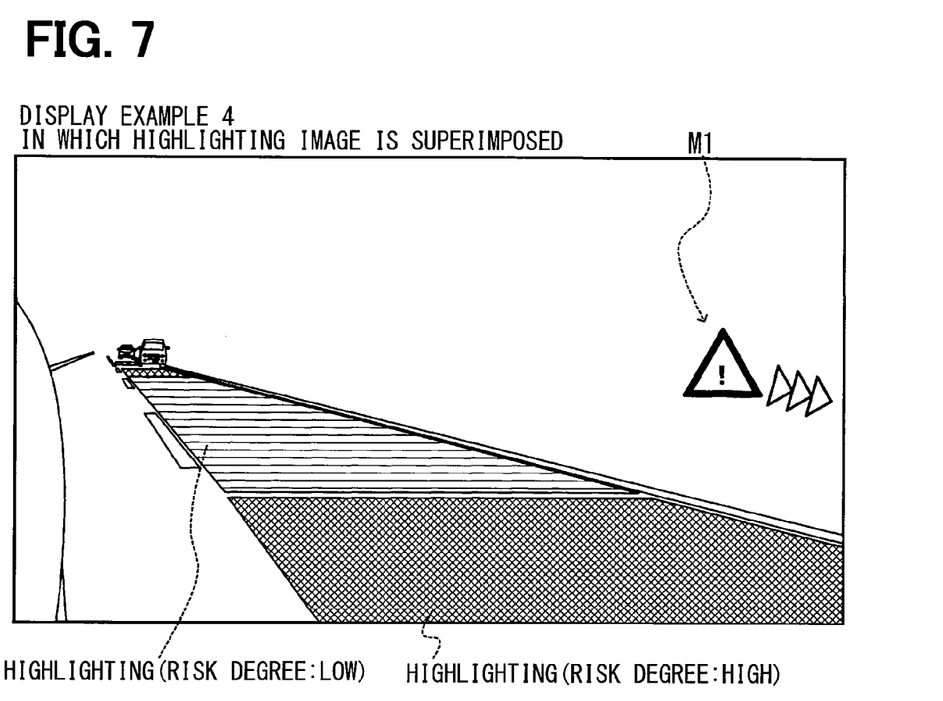
FIG. 7 is a diagram showing a fourth display example in which a highlighted display image is superimposed on the captured image.

FIG. 7 illustrates a fourth display example in which a highlighted display image is superimposed on a captured image different from that in FIG. 5A. In this case, it is assumed that a situation in which a following vehicle is present in a blind spot which falls outside a region captured by the camera 20 in the adjacent lane immediately next to the subject vehicle 100. For example, in a process where the first following vehicle 101 overtakes the subject vehicle 100 from the situation illustrated in FIG. 5A, a situation in which the first following vehicle 101 falls outside the captured image of the camera 20 corresponds to this above case. In this case, when a region high in the degree of risk deriving from the following vehicle which falls outside the captured image remains in the display area, the highlighted display image representing a state in which the degree of risk is high is superimposed and displayed on the captured image. In this situation, when the highlighted display image deriving from the following vehicle that is present outside of the display area is displayed, a warning mark M1 indicating that the following vehicle is present outside of the display area is displayed.

When a white line for distinguishing the lanes from each other is not detected on a road surface, a region having a predetermined size or a line segment having a predetermined length may be displayed as the support information. In this case, the region having the predetermined size or the line segment having the predetermined length may be defined by a line segment obtained by plotting average appearance of the adjacent lane displayed on the captured image. Alternatively, the region having the predetermined size or the line segment having the predetermined length may be defined by a width of the following vehicles travelling in the adjacent lane displayed on the captured image.

(Modifications)

When it is determined that the direction indicator operates in S108 and S114 of the risk determination process (refer to FIG. 2) on the first closest following vehicles, the display mode of the highlighted display image that is superimposed and displayed on the captured image may be changed. Specifically, a color of the highlighted display image may be changed or flickered during the operation of the direction indicator to highlight the display more than usual. According to this configuration, when the driver intends to change the lane, the driver can easily recognize the risk associated with the lane change.

In the display examples of FIGS. 5A, 5B, 6A, and 6B, the highlighted display image corresponding to the degree of risk of the respective levels from the region high in the degree of risk to the region low in the degree of risk is displayed. Alternatively, the highlighted display image may be displayed in the region high in the degree of risk, and nothing may be displayed in the region low in the degree of risk.

According to the vehicle system 1 of the embodiment, the following effects are obtained.

It may be possible to superimpose and display the highlighted display image that can discriminate the degree of risk associated with the lane change on the captured image acquired from the camera 20, on the basis of the risk evaluated for the multiple following vehicles travelling in the adjacent lane. It may be possible to display the highlighted display image in association with the proximity regions before and after the respective following vehicles or the regions between the following vehicles. According this configuration, it may be possible for the driver to grasp the degree of risk associated with the lane change for not only one closest following vehicle but also the subsequent following vehicles in advance.

It may be possible to generate the warning sound corresponding to the degree of risk or to change the display mode of the highlighted display image, on the basis of the operation of the direction indicator. According to the configuration, when the driver intends to change the lane, it may be possible for the driver to clearly grasp the risk associated with the lane change.

The camera 20 corresponds to an imaging portion of the present disclosure. The rear vehicle detector 21 corresponds to a situation acquisition of the present disclosure. The display 30 corresponds to a display portion of the present disclosure. The controller 11 and the display output portion 12 correspond to a display controller of the present disclosure. S100, S200, and the controller 11 correspond to a calculator of the present disclosure. S102, S204, and the controller 11 correspond to an evaluator of the present disclosure. S108, S114, and the driving support apparatus 10 correspond to an operation determiner of the present disclosure.

According to one aspect of the present disclosure, a driving support apparatus that is communicably connected to an imaging portion that images an adjacent lane on a rear side of a subject vehicle, a situation acquisition that acquires information on whether a plurality of following vehicles travelling in the adjacent lane on the rear side of the subject vehicle are present or not and information on positions of the plurality of following vehicles, and a display portion that displays an image is provided. The driving support apparatus comprises: an image acquisition that acquires a captured image captured by the imaging portion; a calculator that calculates distance and relative speed between the subject vehicle and a following vehicle, and distances and relative speeds between the following vehicles, on a basis of the information acquired by the situation acquisition; an evaluator that evaluates a degree of risk caused when the subject vehicle changes a lane to the adjacent lane with respect to the following vehicles on a basis of the distances and the relative speeds calculated by the calculator; and a display controller that creates support information on the degree of risk associated with a lane change in association with road sections based on positions at which the following vehicles are present on a basis of an evaluation result of the degree of risk by the evaluator, and displays a support image in which a created support information is superimposed on the captured image at a corresponding position on the display portion.

According to the driving support apparatus of the present disclosure, it may be possible to superimpose and display the support information associated with the road sections based on the positions at which the multiple following vehicles are present on the captured image, on the basis of the degree of risk evaluated for the multiple following vehicles that travel in the adjacent lane. According to the configuration, it may be possible that the driver grasps the degree of risk associated with the lane change for not only one closest following vehicle but also the subsequent following vehicles in advance.

The flowchart or the process in the flowchart disclosed in this application is formed of multiple sections (or which are referred to as steps), and for example, each section is represented by S100. Each section can be divided into multiple sub-sections, and in contrast, multiple sections can also be combined into one section.

In addition, each of the aforementioned multiple sections or a combination thereof can be realized not only as (i) a software section combined with a hardware (a computer, for example) but also as (ii) a hardware section (an integrated circuit or a wired logic circuit, for example) while including or not including functions of the related devices. Furthermore, the hardware section can be configured inside a microcomputer.

In the present embodiment, paying attention to the functions provided in the controller 11, the interior of the controller 11 is classified into the image acquisition, the calculator, the evaluator, and the display controller for convenience, and it is not meant that the interior of the controller 11 is physically partitioned into portions corresponding to the respective "portions".

While the embodiments, the configurations, and the modes according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving support apparatus that is communicably connected to an imaging portion that images an adjacent lane on a rear side of a subject vehicle, a situation acquisition that acquires information on whether a plurality of following vehicles travelling in the adjacent lane on the rear side of the subject vehicle are present, or not, and information on positions of the plurality of following vehicles, and a display portion that displays an image, the driving support apparatus comprising:

an image acquisition that acquires a captured image captured by the imaging portion;

a calculator that calculates distance and relative speed between the subject vehicle and a following vehicle, and distances and relative speeds between the following vehicles, on a basis of the information acquired by the situation acquisition;

an evaluator that evaluates a degree of risk caused when the subject vehicle changes a lane to the adjacent lane with respect to the following vehicles on a basis of, calculated by the calculator, the distance and relative speed between the subject vehicle and the following vehicle, and the distances and the relative speeds between the following vehicles; and a display controller that creates support information on the degree of risk associated with a lane change in association with road sections based on positions at which the following vehicles are present on a basis of an evaluation result of the degree of risk by the evaluator, and displays a support image in which a created support information is superimposed on the captured image at a corresponding position on the display portion.

2. The driving support apparatus according to claim 1, wherein:

the display controller creates the support information corresponding to the road sections immediately before and immediately after a position at which each of the following vehicles is present; and the display controller displays the support image in which the created support information is superimposed on the road sections immediately before and immediately after each of the following vehicles, which are reflected on the captured image.

3. The driving support apparatus according to claim 1, wherein:

the display controller creates the support information corresponding to a road section in a middle region of two continuous following vehicles; and the display controller displays the support image in which the created support information is superimposed on a position of the road section in the middle region of the two continuous following vehicles, which is reflected on the captured image.

4. The driving support apparatus according to claim 1, wherein:

the display controller displays, as the support information, the support image in which a design of a mode that is capable of discriminating the degree of risk associated with the lane change is superimposed on the captured image.

5. The driving support apparatus according to claim 4, wherein:

when a white line distinguishing lanes from each other is not detected on a road surface, the display controller displays a region having a predetermined size or a line segment having a predetermined length as the support information.

6. The driving support apparatus according to claim 5, wherein:

the region having the predetermined size or the line segment having the predetermined length is defined by a line segment obtained by plotting average appearance of the adjacent lane displayed on the captured image.

7. The driving support apparatus according to claim 5, wherein:

the region having the predetermined size or the line segment having the predetermined length is defined by a width of the following vehicles travelling in the adjacent lane displayed on the captured image.

8. The driving support apparatus according to claim 4, wherein:

the display controller creates the support information changed in at least one of a color, a pattern, and a transparency of the design of the support information according to the degree of risk associated with the lane change; and the display controller draws the support information in a region of the captured image except for a region overlapping with the following vehicles.

9. The driving support apparatus according to claim 4, wherein:

the display controller creates the support information in which a line segment changed in at least one of a color, a thickness, and a pattern according to the degree of risk associated with the lane change is drawn along a road surface in the captured image; and the display controller draws the line segment in a region of the captured image except for regions overlapping with the following vehicles.

10. The driving support apparatus according to claim 4, wherein:

the display controller creates the support information in which a line segment changed in at least one of a color, a thickness, and a pattern according to the degree of risk associated with the lane change is drawn along a white line separating lanes on the road surface in the captured image; and the display controller draws the line segment in a region of the captured image except for regions overlapping with the following vehicles.

11. The driving support apparatus according to claim 1, further comprising:

an operation determiner that determines whether an operation state of a direction indicator mounted to the subject vehicle; and a warning portion that outputs a warning sound corresponding to the degree of risk evaluated by the evaluator to a predetermined sound output portion when the operation determiner determines that the direction indicator operates.

12. The driving support apparatus according to claim 1, further comprising:

an operation determiner that determines whether an operation state of a direction indicator mounted to the subject vehicle, wherein:

the display controller highlights a display mode of the support information when the operation determiner determines that the direction indicator operates.

* * * * *